United States Patent
Matsukawa

(10) Patent No.: US 7,907,475 B2
(45) Date of Patent: Mar. 15, 2011

(54) OBSTACLE DETECTING SYSTEM FOR VEHICLE

(75) Inventor: Norifumi Matsukawa, Kariya (JP)

(73) Assignee: Denso Corporation, Kariya (JP)

( * ) Notice: Subject to any disclaimer, the term of this patent is extended or adjusted under 35 U.S.C. 154(b) by 253 days.

(21) Appl. No.: 12/396,704

(22) Filed: Mar. 3, 2009

(65) Prior Publication Data

US 2009/0224959 A1 Sep. 10, 2009

(30) Foreign Application Priority Data

Mar. 4, 2008 (JP) .................................. 2008-053372

(51) Int. Cl.
*G01S 15/93* (2006.01)
*G01S 7/523* (2006.01)

(52) U.S. Cl. .......................................................... 367/97
(58) Field of Classification Search .................... 367/97, 367/99
See application file for complete search history.

(56) References Cited

U.S. PATENT DOCUMENTS

| | | | |
|---|---|---|---|
| 6,999,003 B2* | 2/2006 | Matsukawa et al. | 340/932.2 |
| 7,236,088 B2* | 6/2007 | Matsukawa et al. | 340/435 |
| 2005/0237168 A1* | 10/2005 | Matsukawa et al. | 340/435 |
| 2005/0285758 A1* | 12/2005 | Matsukawa et al. | 340/932.2 |
| 2008/0165049 A1* | 7/2008 | Wakayama et al. | 342/91 |
| 2009/0224959 A1* | 9/2009 | Matsukawa | 342/73 |
| 2010/0066516 A1* | 3/2010 | Matsukawa | 340/435 |
| 2010/0066534 A1* | 3/2010 | Takeichi et al. | 340/540 |
| 2010/0071471 A1* | 3/2010 | Matsumoto et al. | 73/627 |

FOREIGN PATENT DOCUMENTS

| | | |
|---|---|---|
| JP | 62-64973 | 3/1987 |
| JP | 05-022796 | 1/1993 |
| JP | 09-086312 | 3/1997 |
| JP | 2005-072771 | 3/2005 |
| JP | 2009210404 A * | 9/2009 |

* cited by examiner

*Primary Examiner* — Dan Pihulic
(74) *Attorney, Agent, or Firm* — Nixon & Vanderhye PC

(57) ABSTRACT

An obstacle detecting system for a vehicle detects an obstacle by transmitting a transmitting wave and receiving a receiving wave, which is a reflection of the transmitting wave by the obstacle. The system calculates a distance to the obstacle. The system varies directivity of the transmitting wave in accordance with the calculated distance. The directivity is lowered when the calculated distance is less than a predetermined reference distance, than when the calculated distance is greater than the predetermined reference distance.

5 Claims, 3 Drawing Sheets

OBSTACLE DETECTING SYSTEM FOR VEHICLE

CROSS REFERENCE TO RELATED APPLICATION

This application is based on and incorporates herein by reference Japanese Patent Application No. 2008-53372 filed on Mar. 4, 2008.

FIELD OF THE INVENTION

The present invention relates to an obstacle detecting system mounted on a vehicle for detecting an obstacle.

BACKGROUND OF THE INVENTION

In a conventional obstacle detecting system (e.g., JP 2005-72771A), a clearance sonar sensor is mounted on a vehicle to transmit an ultrasonic wave as a transmitting wave and receive the ultrasonic wave reflected by an obstacle as a receiving wave.

The obstacle detecting system is configured to mask the reception of the receiving wave while the transmitting wave is being transmitted as shown in FIG. 7, so that the transmitting wave and the receiving wave are separated thereby preventing the erroneous reception of the transmitting wave as the receiving wave. In the masking period, no receiving wave is received and hence no obstacle detection can be attained. As a result, the masking period causes a dead zone, in which no obstacle can be detected, near the vehicle.

It is essential to increase both the directivity and the energy of the transmitting wave for detecting an obstacle existing at a remote position from the vehicle. In this instance, it is also essential to transmit the transmitting wave for a longer time period. The masking period thus inevitably becomes longer and the dead zone becomes wider.

SUMMARY OF THE INVENTION

It is therefore an object of the present invention to provide an obstacle detecting system, which can detect an obstacle irrespective of the distance to the obstacle.

According to one aspect, an obstacle detecting system for a vehicle has an obstacle detecting section, a distance calculating section and a directivity control section. The obstacle detecting section is configured to detect an obstacle by transmitting a transmitting wave and receiving a receiving wave, which is a reflection of the transmitting wave by the obstacle. The distance calculating section is configured to calculate a distance to the obstacle. The directivity control section is configured to lower a directivity of the transmitting wave to a lower value, when the distance calculated by the distance calculating section is less than a predetermined reference distance, than when the distance is greater than the predetermined reference distance.

Preferably the directivity control section is configured to lower the frequency of the transmitting wave for lowering the directivity of the transmitting wave.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
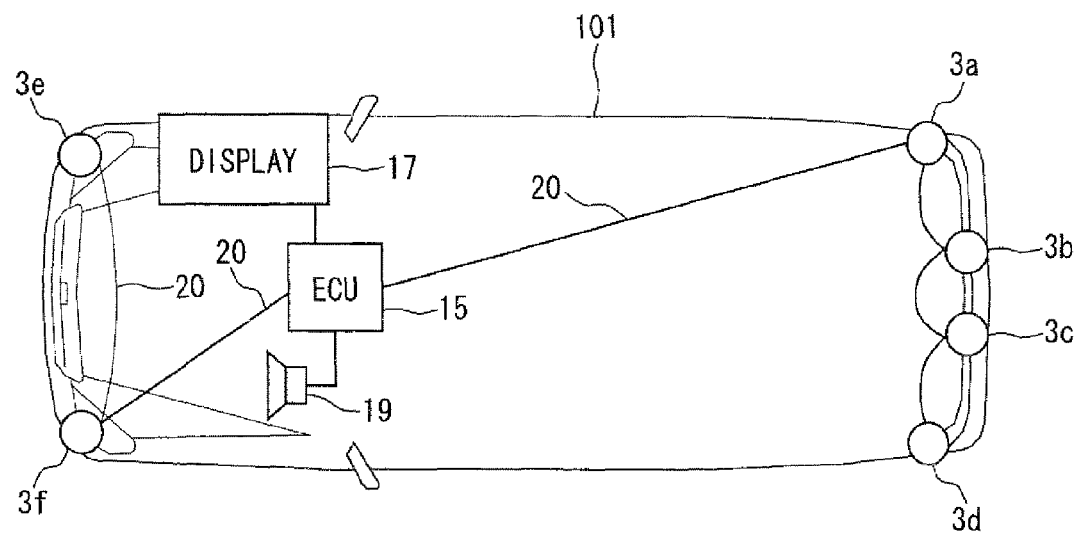
FIG. 1 is a schematic view showing an embodiment of an obstacle detecting system for a vehicle according to the present invention.

Referring to FIG. 1 showing one embodiment of the present invention, an obstacle detecting system 1 is mounted on a vehicle 101 and includes clearance sonar sensors 3a to 3f, an electronic control unit (clearance sonar ECU) 15, a display 17, a buzzer 19 and a harness 20.

The clearance sonar sensors 3a to 3f are attached to the rear right end, rear center, rear center, rear left end, front right end and front left end of the vehicle 101. The clearance sonar sensors 3a, 3b, 3c and 3d are ultrasonic sensors that are configured to detect obstacles in the rearward direction of the vehicle 101. The clearance sonar sensors 3e and 3f are also ultrasonic sensors that are configured to detect obstacles in the forward direction of the vehicle 101. All the clearance sonar sensors 3a to 3f have substantially the same mechanical and electrical configuration.

Figure 2:
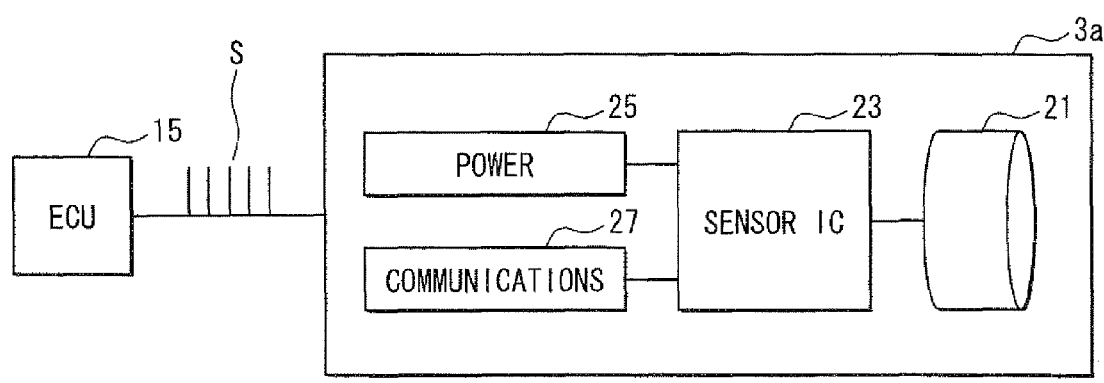
FIG. 2 is a block diagram showing a clearance sonar sensor used in the embodiment.

As shown in FIG. 2, each clearance sonar sensor, for example sensor 3a, is configured to have a microphone 21, a sensor integrated circuit (IC) 23, a power circuit 25 and a communications circuit 27. The microphone 21 is configured to transmit an ultrasonic wave as a transmitting wave in response to a communications signal S generated by the ECU 15. The clearance sonar sensor 3a is configured to receive, as a receiving wave, the ultrasonic wave reflected by an obstacle.

Figure 3:
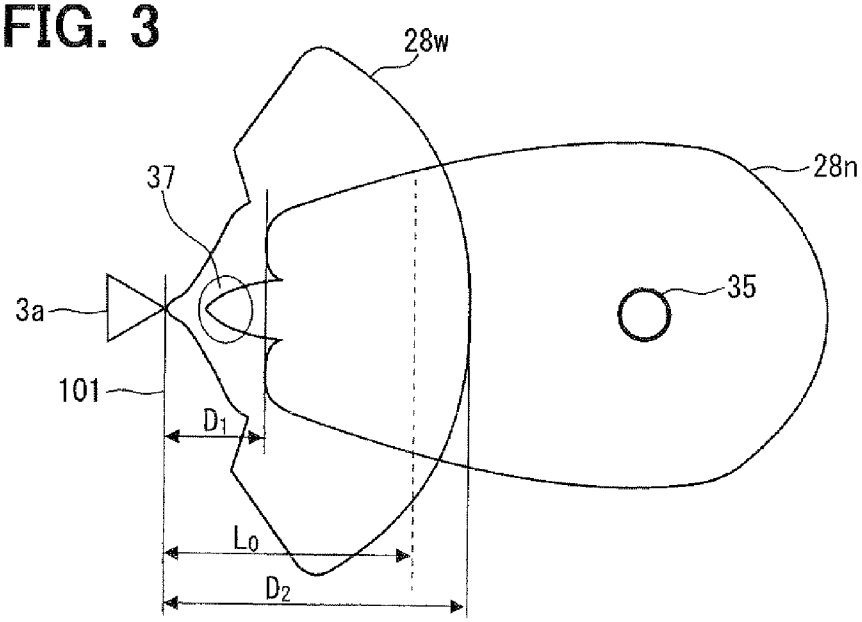
FIG. 3 is a schematic diagram showing directivity of a transmitting wave transmitted from the clearance sonar in the embodiment.

The sensor IC 23 is configured and programmed to variably set the frequency of the transmitting wave transmitted from the microphone 21 in response to the communications signal generated by the ECU 15. Thus, the ultrasonic sonar sensor 3a and as a result its transmitting wave is controlled to have different directivity. The frequency of the transmitting wave may be a first frequency f1 or a second frequency f2, which is lower than the first frequency f1. The frequency f1 may be in the range of 58.8 to 66.7 kHz and the frequency f2 may be in the range of 40.0 to 45.7 kHz, for example. If the frequency of the transmitting wave is set to the first (high) frequency f1, the directivity of the transmitting wave is high so that the transmitting wave is transmitted in a narrow range 28n as shown in FIG. 3. If the frequency of the transmitting wave is set to the second (low) frequency f2, the directivity of the transmitting wave is low so that the transmitting wave is transmitted in a wide range 28w.

The power circuit 25 in FIG. 2 is connected to supply electric power to the sensor IC 15, the microphone 21 and the communications circuit 27. The communications circuit 27 is configured to perform various communications between the clearance sonar sensor 3a and the ECU 23. Specifically, the communications circuit 27 transmits a communications signal S generated by the ECU 15 to the clearance sonar sensor 3a to control the operation of the clearance sonar sensor 3a. The communications circuit 27 transmits a detection signal D indicative of the reception of the receiving wave from the clearance sonar sensor 3a to the ECU 15.

The ECU 15 (FIG. 1) is configured to generate and transmit the communications signals S to each clearance sonar sensors 3a to 3f to control operations of the respective sensors. This control includes control of the frequency of the transmitting wave of the microphone 21.

The ECU 15 is configured to determine existence of an obstacle based on the detection signal generated from any of the clearance sonar sensors 3a to 3f when the receiving signal is received as a reflection of the transmitted ultrasonic wave, and calculates a distance from the vehicle 101 to the obstacle. Specifically, the ECU 15 calculates a time interval between a time point (Tt) at which the transmission of the transmitting wave is instructed and a time point (Tr) at which the detection signal generated by any of the clearance sonar sensors 3a to 3f is received.

The ECU 15 is configured further to mask the reception of, that is, not to receive, the detection signals of the sonar sensors 3a to 3f for a predetermined period from the time point Ta, if the directivity of the clearance sonar sensors 3a to 3f is high. Thus, the transmitting wave and the receiving wave can be separated so that the transmitting wave may not be determined as the receiving wave erroneously.

Figure 5:
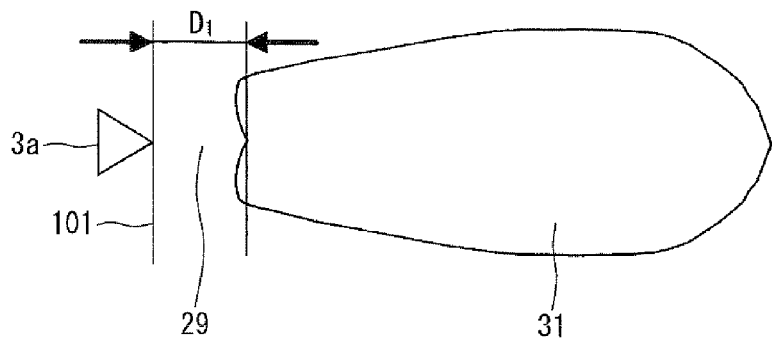
FIG. 5 is a schematic diagram showing a dead zone caused if the directivity of the transmitting wave is high.

If the directivity of the clearance sonar sensor 3a to 3f is high, the masking operation causes a dead zone 29 of a distance D1, as shown in FIGS. 3 and 5, in which no obstacle can be detected. Therefore, it is only possible to detect an obstacle that exists in a limited range 31 which is more than the distance D1 from the vehicle 101 (e.g., sensor 3a).

Figure 6:
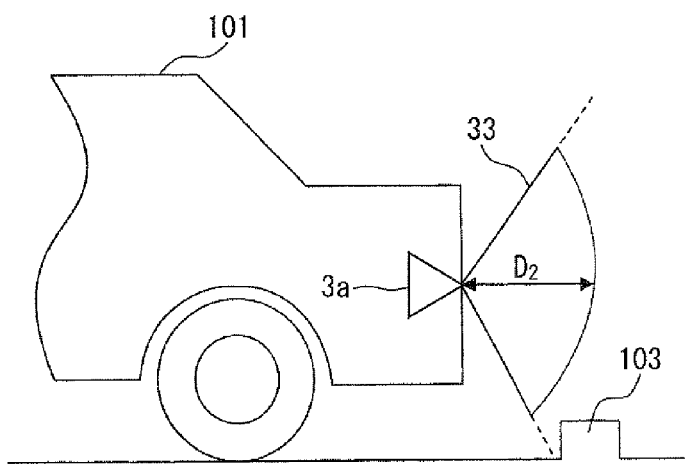
FIG. 6 is a schematic view showing a range of detecting an obstacle if the directivity of the transmitting wave is low.
Figure 7:
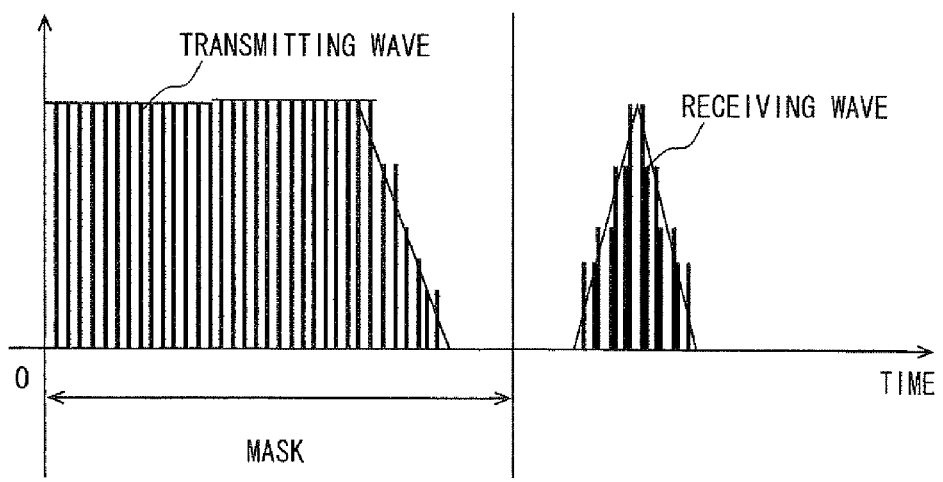
FIG. 7 is a time chart showing processing of separating the transmitting wave and the receiving wave by masking.

If the directivity of the clearance sonar sensor 3a to 3f is low, the ECU 15 ignores the detection signal of the receiving signal received by any of the clearance sonar sensors 3a to 3f after a predetermined time period from the time point Ta. That is, the ECU 15 is configured not to have any masking period but to receive the detection signal from the clearance sonar sensors 3a to 3f only within the predetermined time period from the time point Ta. In this case, as shown in FIGS. 3 and 6, a range 33 of detection of an obstacle is limited to be within a distance D2 from the vehicle 101 (sensor 3a). As a result, any obstacle 103 existing more than the distance D2 away from the clearance sonar sensor 3a cannot be detected.

In the case of the low directivity, the transmitting wave propagates in a wider range as time elapses from the time point Ta and reaches the obstacle, which need not be detected. However, by limiting the range of detection to the range 33 as above, it is prevented that the obstacle 103 is unnecessarily detected. If an obstacle at the remote location need not be detected, the directivity of the clearance sonar sensors 3a to 3f is set low. For this reason, the period of transmission of the transmitting wave is shortened, and the transmission energy is decreased. Thus, the dead zone near the vehicle is narrowed to detect an obstacle near the vehicle.

The display 17 is a liquid crystal display panel provided in a passenger compartment of the vehicle 101 and configured to display the result of obstacle detection operation of the clearance sonar sensors 3a to 3f. The buzzer 19 is also provided in the passenger compartment and configured to generate a sound alarm to a driver of the vehicle 101, when the distance to the obstacle calculated by the ECU 15 decreases to be less than a predetermined reference distance (threshold distance) L.

Figure 4:
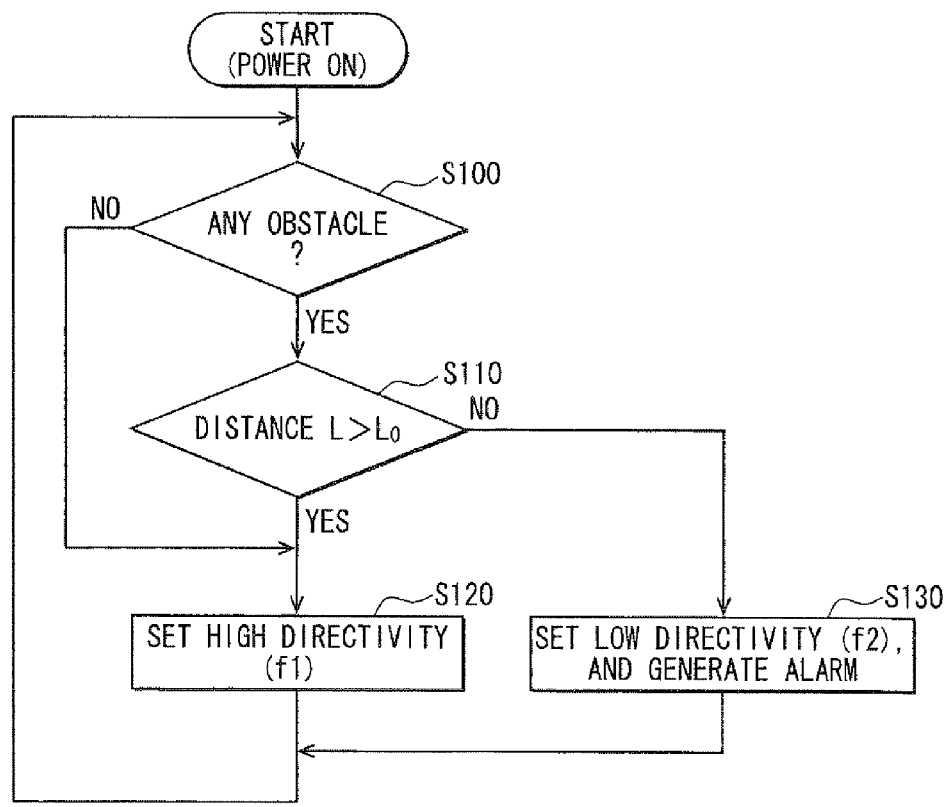
FIG. 4 is a flowchart showing processing executed in the embodiment.

The ECU 15 is programmed to vary the directivity of the clearance sonar sensors 3a to 3f by executing the processing shown in FIG. 4. This processing is started, after an engine of the vehicle 101 is started and a power supply to the system is turned on.

At S100, it is checked whether any obstacle is detected based on the detection signal of the receiving wave transmitted from the clearance sonar sensors 3a to 3f to the ECU 15. It is assumed that the frequency of the transmitting wave is set to the high frequency f1 so that the directivity of the transmitting wave is also set high. If any obstacle is detected, S110 is executed. If no obstacle is detected, S120 is executed.

At S110, it is checked whether the calculated distance L between the vehicle 101 and the detected obstacle is greater than a predetermined reference distance Lo. Here, the distance L is calculated in proportion to the time interval from the time point Ta to the time point Tb as described above. Further, the predetermined reference distance Lo is set to be greater than the distance D1 corresponding to the dead zone 29 shown in FIGS. 3 and 5 and less than the range corresponding to the distance D2 shown in FIGS. 3 and 6. If the calculated distance L is greater and less than the predetermined reference distance Lo, that is, the obstacle is away and close to the vehicle 101, S120 and S130 are executed, respectively.

At S120, the directivity of all the clearance sonar sensors 3a to 3f is set high by setting the frequency of the transmitting wave to the first frequency f1 higher than the second frequency f2. That is, the directivity of the transmitting wave is maintained high. Thus, the clearance sonar sensors 3a to 3f are tuned to detect surely the obstacle, which exists rather away from the vehicle 101.

At S130, the directivity of only one or some of the clearance sonar sensors 3a to 3f, which has detected the obstacle, is set low by setting the frequency of the transmitting wave to the second frequency f2 lower than the first frequency f1. Thus, the clearance sonar sensor is tuned to detect surely the obstacle, which exists close to the vehicle 101. In addition, the buzzer 19 is activated to generate the alarm in the vehicle compartment to notify that the vehicle 101 is close to the obstacle. After S120 and S130, the above processing is repeated.

The obstacle detecting system 1 provides the following advantages.

(1) The obstacle detecting system 1 can detect an obstacle, which exists in the front area or the rear are of the vehicle 101, whether the obstacle is very close or relatively away from the vehicle 101. If the distance of an obstacle 35 from the vehicle 101 is greater than the predetermined distance D2 as shown in FIG. 3 and the directivity of the clearance sonar sensors 3a to 3f is set low (detection range 28w), the obstacle 35 cannot be detected. This is because the transmitting wave is directed in the wide area 28w, the transmitting wave of sufficient energy does not reach the remote locations. However, the obstacle detecting system 1 changes the directivity of the clearance sonar sensors 3a to 3f to the high directivity in accordance with the distance from the vehicle 101 to the obstacle, As a result, the obstacle detecting system 1 can surely detect the obstacle 35.

If the distance of an obstacle 37 from the vehicle 101 is less than the predetermined distance D1 as shown in FIG. 3 and the directivity of the clearance sonar sensors 3a to 3f is high, the obstacle 37 cannot be detected. However, the obstacle detecting system 1 changes the directivity of the clearance sonar sensors 3a to 3f to the low directivity in accordance with the distance from the vehicle to the obstacle. As a result, the obstacle detecting system 1 can surely detect the obstacle.

In an exemplary case, in which the vehicle 101 approaches the obstacle, the directivity of the clearance sonar sensors 3a to 3f is first set high (S100, S110, S120), so that the detection range is extended to cover even a remote location and detect any obstacle at an early time. When the vehicle 101 approaches the obstacle to be less than the predetermined reference distance Lo, the directivity of the clearance sonar sensors 3a to 3f is changed to the low directivity (S100, S110, S130). As a result, even when the vehicle 101 approaches close to the obstacle, the obstacle will not enter the dead zone and hence can be detected surely.

(2) The obstacle detecting system 1 generates an alarm when the vehicle approaches close to the obstacle. As a result, a driver can recognize any obstacle near the vehicle 101.

The present invention is not limited to the above one embodiment, it may be implemented in various other embodiments.

For example, the obstacle detecting system 1 may be modified to set the directivity of the clearance sonar sensors 3a to 3f based on the number of times of transmission and reception in place of the calculated distance between the vehicle 101 and the obstacle (S110 in FIG. 4). Here, the number of times of transmission and reception is the number of detection information such as distance information of obstacle incoming in a detection period of a sensor, which is periodically transmitted and received. It is assumed here that an obstacle approaches to the vehicle 101 or the vehicle 101 leaves from an obstacle at a constant relative speed. As the relative speed is increased, the distance of the obstacle detectable in the detection period becomes greater. In this case, if the speed is high, the obstacle is determined to be dangerous to the vehicle and the directivity is set low. If the speed is low, the obstacle is determined to be not so dangerous and the directivity is set high.

The directivity of the transmitting wave may be varied in a plurality of directivity, which is more than two.

What is claimed is:

1. An obstacle detecting system for a vehicle comprising:
   an obstacle detecting section configured to detect an obstacle by transmitting a transmitting wave and receiving a receiving wave, which is a reflection of the transmitting wave by the obstacle;
   a distance calculating section configured to calculate a distance to the obstacle; and
   a directivity control section configured to lower a directivity of the transmitting wave to a lower value, when the distance calculated by the distance calculating section is less than a predetermined reference distance than when the distance is greater than the predetermined reference distance.

2. The obstacle detecting system according to claim 1, wherein the directivity control section is configured to lower a frequency of the transmitting wave for lowering the directivity of the transmitting wave.

3. The obstacle detecting system according to claim 1, further comprising:
   an alarm section configured to issue an alarm, when the distance calculated by the distance calculating section is less than the predetermined reference distance.

4. The obstacle detecting system according to claim 1, wherein the distance calculating section is configured to calculate the distance based on a time interval from transmission of the transmitting wave to reception of the receiving wave by the obstacle detecting section.

5. The obstacle detecting system according to claim 1, wherein the obstacle detecting section is attached to any one of a front part, a side part and a rear part of the vehicle.

* * * * *